(12) United States Patent
Chen (10) Patent No.: US 10,365,505 B2
(45) Date of Patent: Jul. 30, 2019

(54) SIDE PIECE STRUCTURE OF A PAIR OF GLASSES

(71) Applicant: Lin Yun Chen, Tainan (TW)

(72) Inventor: Lin Yun Chen, Tainan (TW)

( * ) Notice: Subject to any disclaimer, the term of this patent is extended or adjusted under 35 U.S.C. 154(b) by 29 days.

(21) Appl. No.: 15/706,778

(22) Filed: Sep. 18, 2017

(65) Prior Publication Data
US 2019/0086688 A1    Mar. 21, 2019

(51) Int. Cl.
*G02C 5/14* (2006.01)
*G02C 11/00* (2006.01)
*G02C 11/02* (2006.01)
*G02C 11/04* (2006.01)

(52) U.S. Cl.
CPC .............. *G02C 11/12* (2013.01); *G02C 5/146* (2013.01); *G02C 11/02* (2013.01); *G02C 11/04* (2013.01); *G02C 11/10* (2013.01)

(58) Field of Classification Search
CPC .......... G02C 5/146; G02C 5/14; G02C 11/02; G02C 11/04; G02C 11/12; G02C 11/10
USPC ........ 351/51, 52, 111, 123, 158; 2/426, 431, 2/438, 448, 449, 451
See application file for complete search history.

(56) References Cited

U.S. PATENT DOCUMENTS

| 3,384,903 | A   | * | 5/1968  | Malcom, Jr. | A61F 9/02   |
|           |     |   |         |             | 2/12        |
| 2006/0268217 | A1 | * | 11/2006 | Teng        | G02C 7/16   |
|           |     |   |         |             | 351/41      |
| 2008/0301846 | A1 | * | 12/2008 | Brillouet   | B01L 3/508  |
|           |     |   |         |             | 2/13        |
| 2010/0110366 | A1 | * | 5/2010  | Shapiro     | G02C 3/04   |
|           |     |   |         |             | 351/112     |
| 2017/0315385 | A1 | * | 11/2017 | Chung       | F21V 21/0885 |

\* cited by examiner

*Primary Examiner* — Darryl J Collins
(74) *Attorney, Agent, or Firm* — Bruce Stone LLP; Joseph Bruce (57) ABSTRACT

Provided is a side piece structure of a pair of glasses, including at least one temple and at least one side plate. The at least one temple includes a slot, a fastener hole, a pivot hole and a first mark. The at least one side plate includes a bracket, a fastener bump, a pivot, a second mark and a side cover. The pivot is inserted into the pivot hole, and then the fastener bump is engaged with the fastener hole. The bracket is fitted into the slot, and then the first mark is aligned with the second mark.

5 Claims, 9 Drawing Sheets

SIDE PIECE STRUCTURE OF A PAIR OF GLASSES

BACKGROUND OF THE INVENTION

1. Field of the Invention

The present disclosure relates to a pair of glasses, and particularly relates to a side piece structure of a pair of glasses.

2. The Prior Arts

Safety glasses, also known as goggles, are often used in sports, laboratories or at work. The main purpose of safety glasses is to protect a user's eyes.

Figure 1:
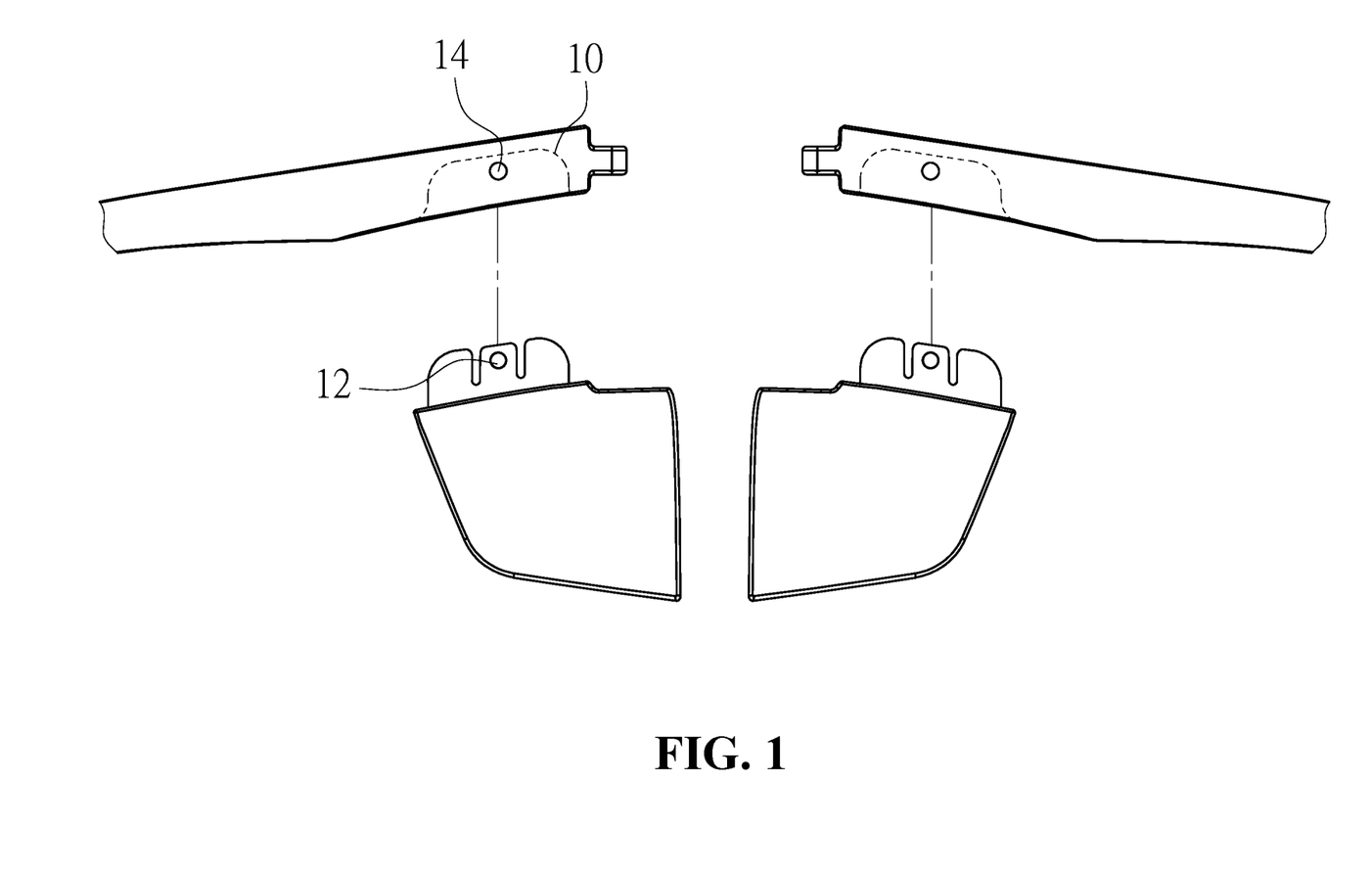
FIG. 1 shows a diagram of a pair of side covers and temples of prior art.

With the continuous progress of science and technology, in recent years, safety glasses in technology and application materials have a lot of breakthroughs. However, as shown in FIG. 1, the prior art side cover is generally free from foolproof design, and it is easy to cause erroneous assembly on both sides. Since only the side cover is inserted into the slot 10 and the positioning bump 12 is engaged into the positioning hole 14, it is likely to enable the side cover to be shaken.

Accordingly, in addition to applicable to a variety of professionals and working environments, a user can enclose or protect the area surrounding the eye in order to prevent particulates, water or chemicals from striking the eyes. Moreover, when wearing a pair of glasses with side covers, the side covers will not make the user feel uncomfortable. The prior art side covers can not be replaced from a frame or a temple easily. Therefore, how to provide a better side piece structure is one of the important issues.

SUMMARY OF THE INVENTION

In order to achieve the above objective, according to a preferred embodiment, the present disclosure provides a side piece structure of a pair of glasses, including at least one temple, having a slot, a fastener hole, a pivot hole and a first mark; and at least one side piece, having a bracket, a fastener bump, a pivot, a second mark and a side cover, wherein the pivot is inserted into the pivot hole, and the fastener bump is engaged with the fastener hole; the bracket is fitted into the slot, and the first mark is aligned with the second mark.

Preferably, the at least one side piece has a different size.

Preferably, when a user wishes to replace the at least one side piece, the user replaces the at least one side piece by himself/herself.

Moreover, according to another preferred embodiment, the present disclosure also provides a side piece structure of a pair of glasses, including at least one temple, having a slot, a fastener hole, a pivot hole and a first mark; and at least one side piece, having a bracket, a fastener bump, a pivot, a second mark, a coupling groove and a side piece member, wherein the side piece member has a coupling convex portion, wherein the pivot is inserted into the pivot hole, and the fastener bump is engaged with the fastener hole; the bracket is fitted into the slot, and the first mark is aligned with the second mark; and the coupling convex portion of the side piece member is fitted in the coupling groove.

Preferably, the side piece member is a light source device, a gas sensor, an ultraviolet detector, a warning device, an ornament, a logo, a mark or a combination thereof.

DETAILED DESCRIPTION OF THE PREFERRED EMBODIMENT

The detailed description of the present disclosure is provided in combination with the accompanying drawings.

Figure 2:
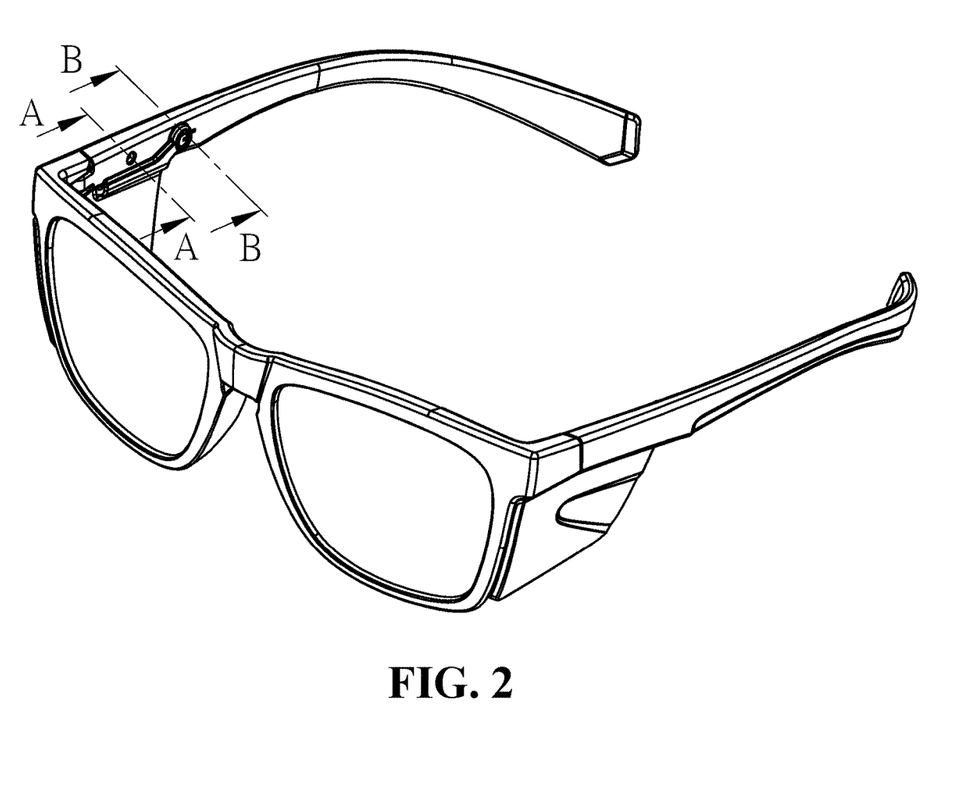
FIG. 2 shows a three-dimensional diagram of a pair of glasses having a side piece structure according to a first preferred embodiment of the present disclosure.
Figure 3:
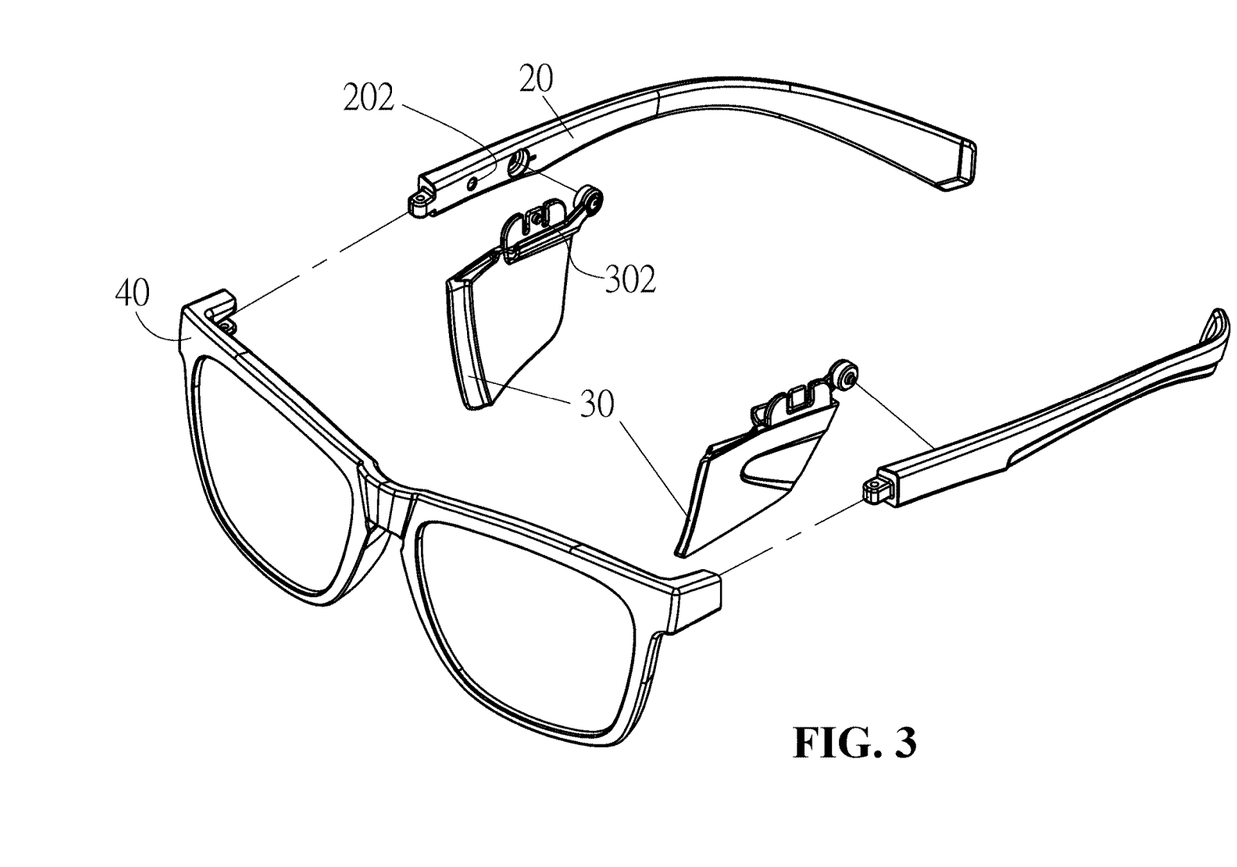
FIG. 3 shows a three-dimensional decomposition diagram of a pair of glasses having a side piece structure according to the first preferred embodiment of the present disclosure.
Figure 4:
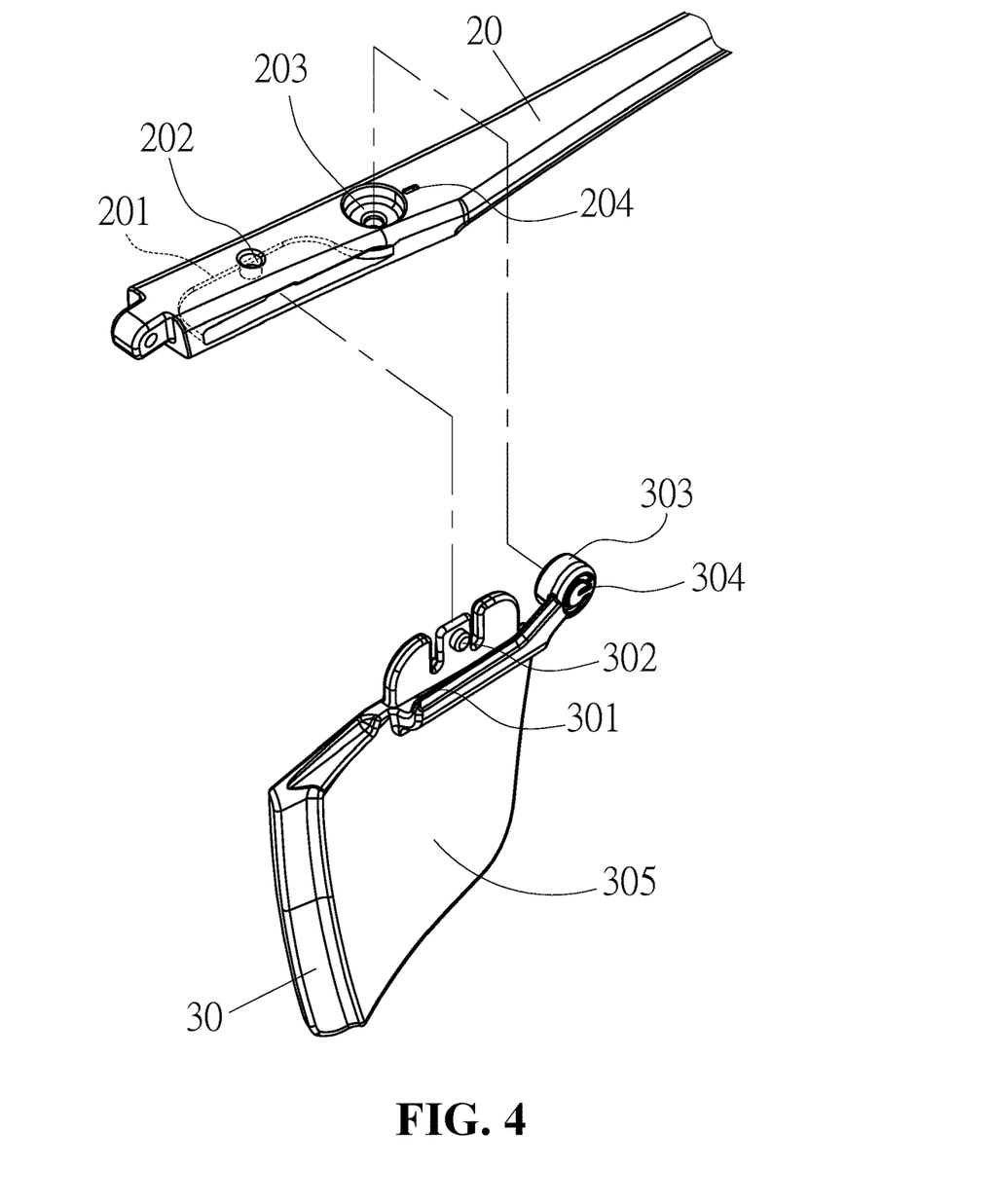
FIG. 4 shows a three-dimensional decomposition diagram of a side piece and a temple according to the first preferred embodiment of the present disclosure.

According to a first preferred embodiment of the present disclosure, FIG. 2 shows a three-dimensional diagram of a pair of glasses having a side piece structure; FIG. 3 shows a three-dimensional decomposition diagram of at least one temple 20, at least one side piece 30 and a frame 40; and FIG. 4 shows a three-dimensional decomposition diagram of at least one temple 20 and at least one side piece 30. As shown in FIGS. 2-4, the side piece structure of the present disclosure includes at least one temple 20 and at least one side piece 30.

Referring to FIG. 3 and FIG. 4, the at least one temple 20 of the present disclosure includes a slot 201, a fastener hole 202, a pivot holt 203 and a first mark 204. In addition, the at least one side piece 30 of the present disclosure includes a bracket 301, a fastener bump 302, a pivot 303, a second mark 304 and a side cover 305. It is worth mentioning that the side cover 305 may be integrally formed with the bracket 301, or the side cover 305 may be assembled to the bracket 301.

Moreover, the pivot 303 of the at least one side piece 30 may be inserted into the pivot hole 203 of the at least one temple 20, and then the fastener bump 302 of the at least one side piece 30 may be engaged with the fastener hole 202 of the at least one temple 20. Also, the bracket 301 of the at least one side piece 30 is fitted into the slot 201 of the at least one temple 20, and then it is confirmed whether the first mark 204 of the at least one temple 20 is aligned with the second mark 304 of the at least one side piece 30.

It is worth mentioning that since the at least one temple 20 and the at least one side piece 30 of the present disclosure have a first mark 204 and a second mark 304, respectively, the present disclosure is able to effectively prevent a user from incorrect assembly.

Additionally, since the fastener bump 302 of the at least one side piece 30 is engaged with the fastener hole 202 of the at least one temple 20 and the bracket 301 of the at least one side piece 30 is fitted into the slot 201 of the at least one temple 20, the stability and safety of assembling the temple 20 and the side piece 30 are effectively increased to prevent shaking. Therefore, the side piece of the present disclosure are not easily peeled off or loosened.

Further, the at least one side piece 30 of the present disclosure has a different size such that the damage caused by different particles or chemical substances can be effectively avoided. Also, the at least one side piece 30 of the present disclosure will not interfere with the field of view. It should be noted that the at least one of the side piece 30 of the present disclosure is made of a material that does not irritate the skin.

Figure 5:
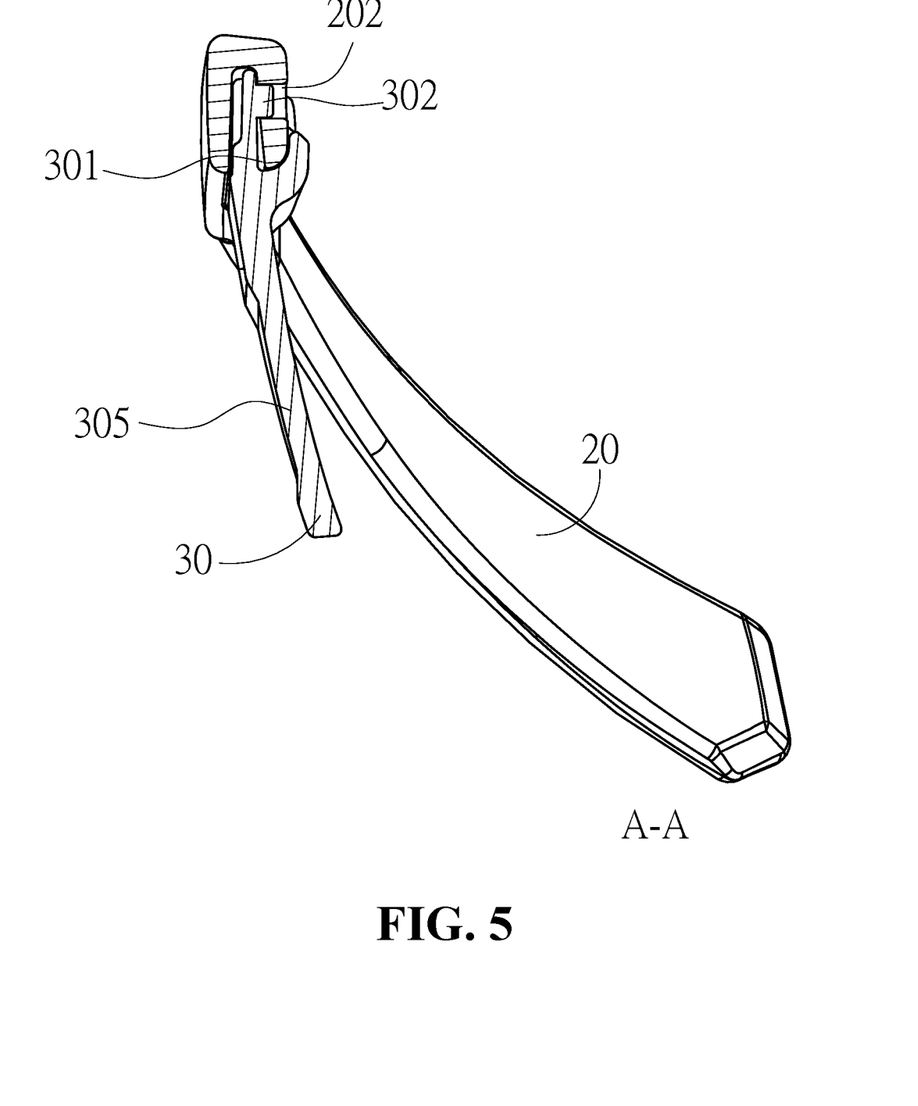
FIG. 5 shows a cross-sectional view taken along lines A-A of FIG. 2 according to the first preferred embodiment of the present disclosure.

In the first preferred embodiment of the present disclosure, as shown in FIG. 5, when the user wishes to replace the side piece structure of the present disclosure, the user can push the fastener bump 302 of the at least one side piece 30 away from the fastener hole 202 of the at least one temple 20. Therefore, the side piece structure can be disassembled and the user can replace the at least one side piece 30 by itself. In other words, the fastener bump 302 is able to secure the at least one side piece 30 and can prevent the at least one side piece 30 from being easily removed, thereby achieving a safety effect.

Figure 6:
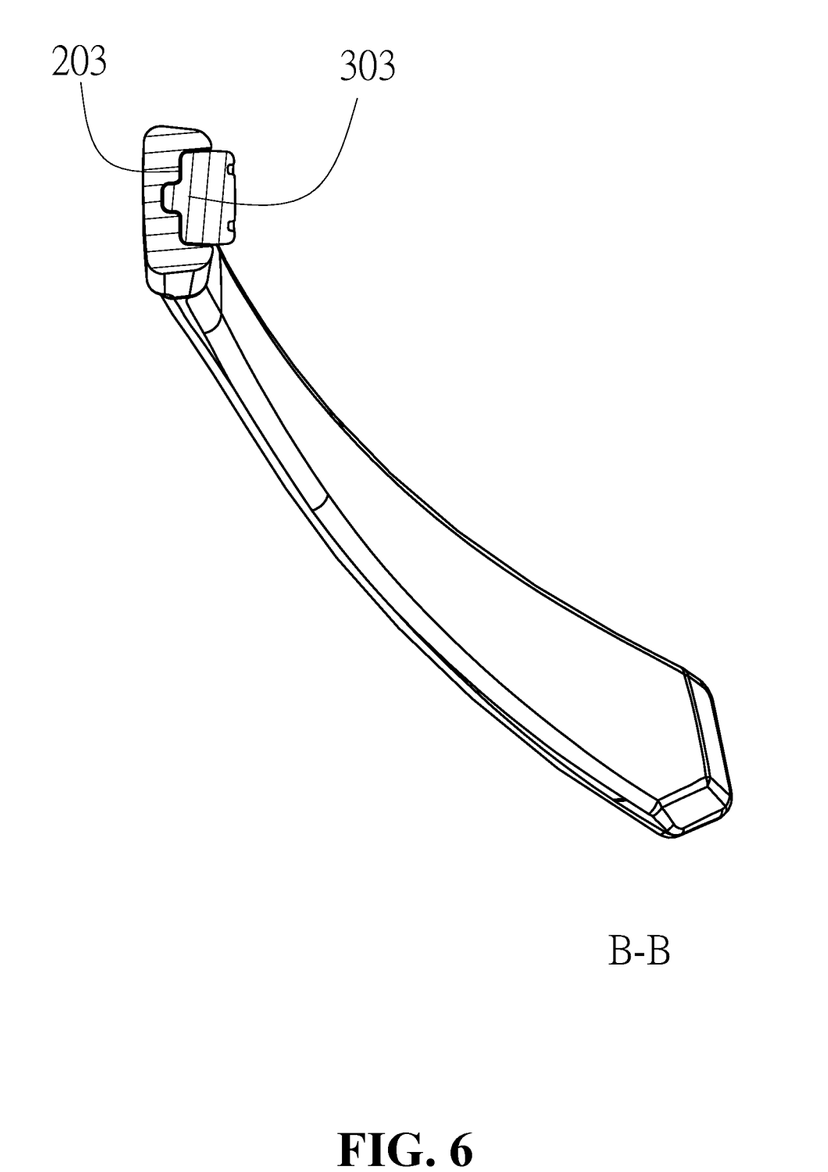
FIG. 6 shows a cross-sectional view taken along lines B-B of FIG. 2 according to the first preferred embodiment of the present disclosure.

According to the first preferred embodiment of the present disclosure, FIG. 6 shows a cross-sectional view taken along lines B-B of FIG. 2 and mainly shows that the pivot 303 of the at least one side piece 30 is inserted into the pivot hole 203 of the at least one temple 20.

Figure 7:
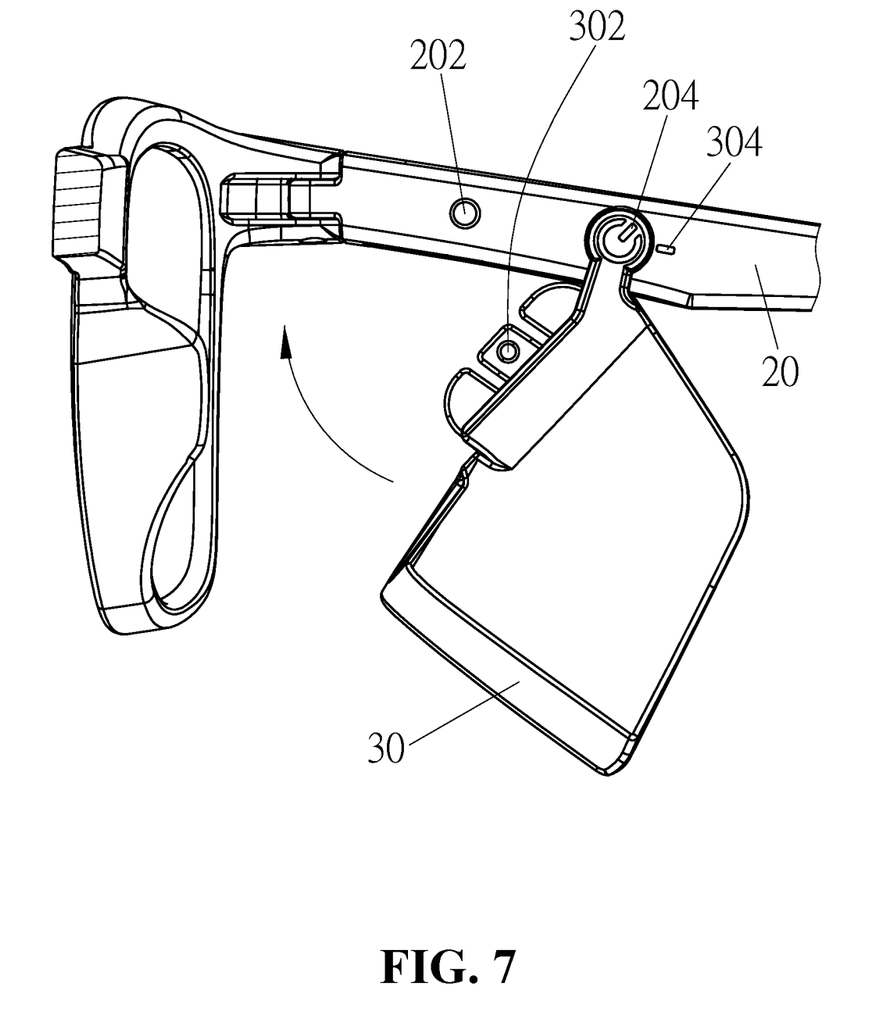
FIG. 7 shows a side view of the side piece and the temple according to the first preferred embodiment of the present disclosure.

Specifically, as shown in FIG. 7, FIG. 7 shows a side view of the at least one side piece 30 and the at least one temple 20. When the at least one side piece 30 is assembled with the at least one temple 20, the first mark 204 of the at least one temple 20 is aligned with the second mark 304 of the at least one side piece 30.

Figure 8:
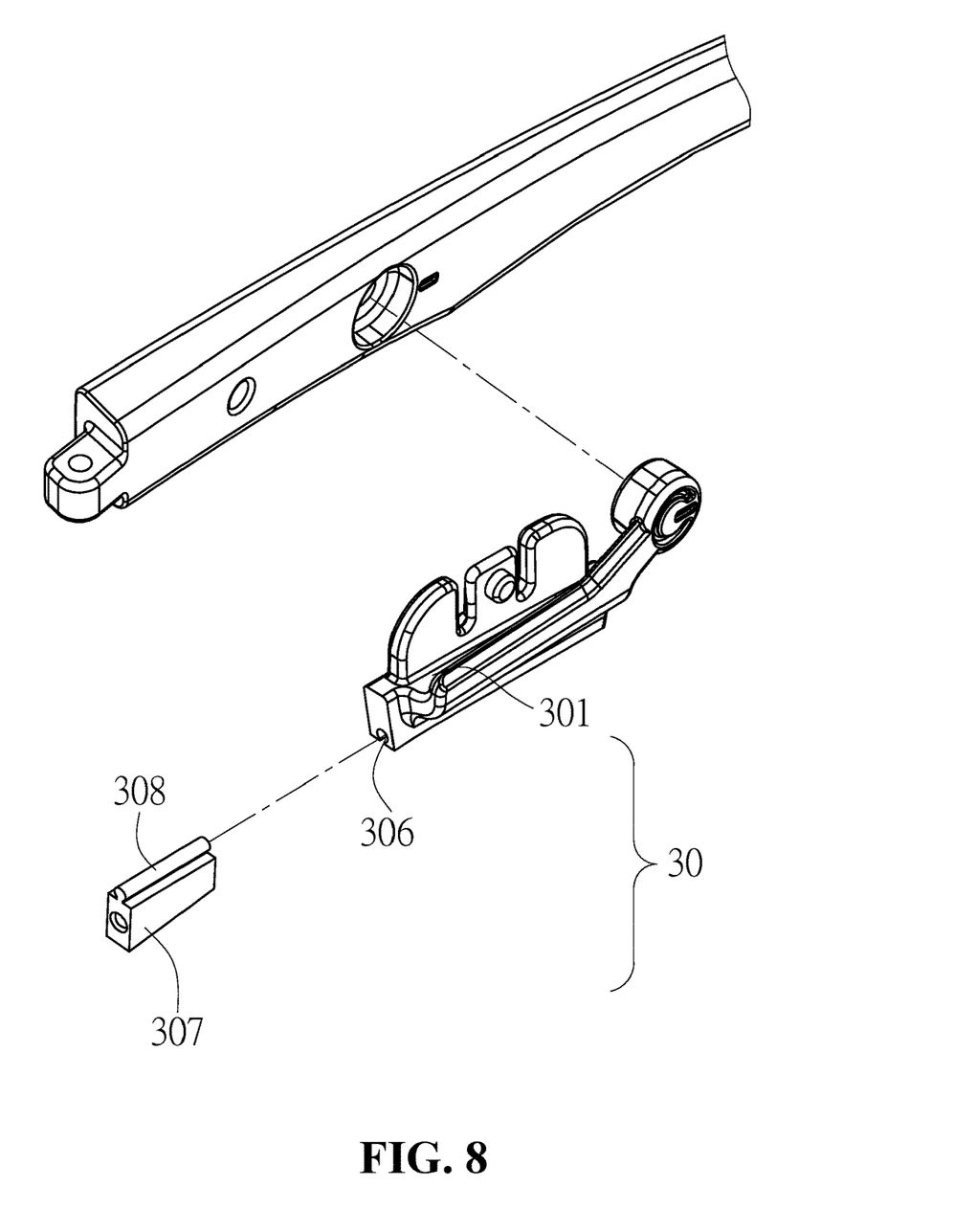
FIG. 8 shows a three-dimensional decomposition diagram of a side piece and a temple according to a second preferred embodiment of the present disclosure.
Figure 9:
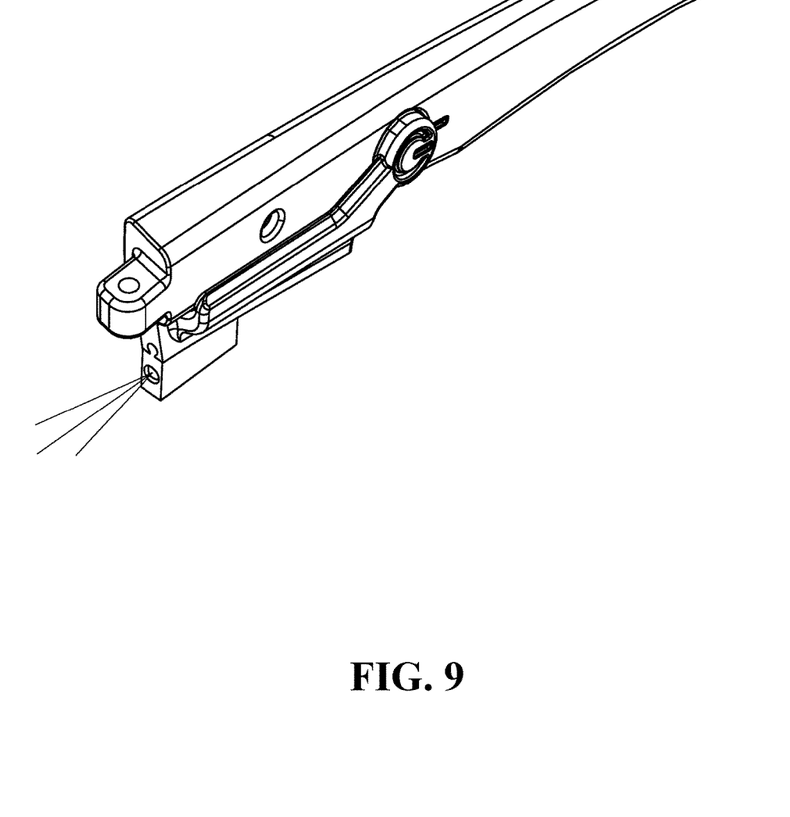
FIG. 9 shows a three-dimensional diagram of the side piece and the temple according to the second preferred embodiment of the present disclosure.

Additionally, the present disclosure also provides a second preferred embodiment. The second preferred embodiment of the present disclosure is similar to the first preferred embodiment. As shown in FIG. 8, the side piece structure of the present disclosure includes: at least one temple 20 and at least one side piece 30. The at least one side piece 30 may includes a coupling groove 306 and a side piece member 307. The side piece member 307 may have a coupling convex portion 308. It is to be noted that the coupling convex portion 308 of the side piece member 307 is fitted in the coupling groove 306. The side piece member 307 can also be fixed to the bracket 301 by locking, engaging or fitting. In addition, the side piece member 307 may be integrally formed with the bracket 301, and the coupling convex portion 308 of the side piece member 307 may be a coupling recessed portion. In other words, the coupling recessed portion may be locked, engaged or fitted in the coupling groove 306.

It should be noted that the side piece member 307 may be a light source device, a gas sensor, an ultraviolet detector, a warning device, an ornament, a logo, a mark or a combination thereof.

To sum up, according to the side piece structure of the present disclosure, the present disclosure has the following advantages. The side piece structure provided by the present disclosure does not feel uncomfortable when worn. The side piece structure can be assembled easily and is less likely to cause damage. The materials of the side piece do not cause the use to be scratched or cut. Moreover, the side piece structure of the present disclosure has a foolproof effect. In addition, the side piece structure of the present disclosure also has the advantage of being easily replaceable.

Although the present disclosure has been described with reference to the preferred exemplary preferred embodiments thereof, it is apparent to those skilled in the art that a variety of modifications and changes may be made without departing from the scope of the present disclosure which is intended to be defined by the appended claims.

What is claimed is:

1. A side piece structure of a pair of glasses, comprising:
   at least one temple, having a slot, a fastener hole, a pivot hole and a first mark; and
   at least one side piece, having a bracket, a fastener bump, a pivot, a second mark and a side cover,
   wherein the pivot hole is a groove not penetrating through the at least one temple, the pivot of the at least one side piece is inserted into the pivot hole from an inner side of the at least one temple, and the fastener bump is engaged with the fastener hole; the bracket is fitted into the slot, and the first mark is aligned with the second mark.

2. The side piece structure of a pair of glasses of claim 1, wherein when a user wishes to replace the at least one side piece, the user replaces the at least one side piece by himself/herself.

3. A side piece structure of a pair of glasses, comprising:
   at least one temple, having a slot, a fastener hole, a pivot hole and a first mark; and
   at least one side piece, having a bracket, a fastener bump, a pivot, a second mark, a coupling groove and a side piece member, wherein the side piece member has a coupling convex portion,
   wherein the pivot is inserted into the pivot hole, and the fastener bump is engaged with the fastener hole; the bracket is fitted into the slot, and the first mark is aligned with the second mark; and the coupling convex portion of the side piece member is fitted in the coupling groove.

4. The side piece structure of a pair of glasses of claim 3, wherein the side piece member is a light source device, a gas sensor, an ultraviolet detector, a warning device, an ornament, a logo, a mark or a combination thereof.

5. The side piece structure of a pair of glasses of claim 3, wherein when a user wished to replace the at least one side piece, the user replaces the at least one side piece by himself/herself.

* * * * *